(12) United States Patent
Blazkiewicz et al.

(10) Patent No.: US 6,839,495 B1
(45) Date of Patent: Jan. 4, 2005

(54) POLED WAVEGUIDE STRUCTURE WITH STABILIZED INTERNAL ELECTRIC FIELD

(75) Inventors: Paul Blazkiewicz, Moorebank (AU); Danny Wong, Baulkham Hills (AU); Wei Xu, Bankstown (AU); Thomas Ryan, Chippendal (AU)

(73) Assignee: The University of Sydney, Sydney (AU)

( * ) Notice: Subject to any disclaimer, the term of this patent is extended or adjusted under 35 U.S.C. 154(b) by 0 days.

(21) Appl. No.: 10/111,326
(22) PCT Filed: Oct. 25, 2000
(86) PCT No.: PCT/AU00/01304

§ 371 (c)(1),
(2), (4) Date: Sep. 5, 2002

(87) PCT Pub. No.: WO01/31390

PCT Pub. Date: May 3, 2001

(30) Foreign Application Priority Data

Oct. 25, 1999 (AU) ............................. PQ 3649

(51) Int. Cl.⁷ ................................. G02B 6/00
(52) U.S. Cl. ....................... 385/122; 385/126
(58) Field of Search ................ 385/122–132, 385/1, 2, 5, 8

(56) References Cited

U.S. PATENT DOCUMENTS

| | | | |
|---|---|---|---|
| 5,036,241 A | | 7/1991 | Michaelis et al. |
| 5,061,028 A | | 10/1991 | Khanarian et al. |
| 5,247,601 A | * | 9/1993 | Myers et al. ............ 385/122 |
| 5,519,802 A | | 5/1996 | Field et al. |
| 5,892,859 A | | 4/1999 | Grote |
| 5,966,233 A | * | 10/1999 | Fujiwara et al. ............ 359/240 |

FOREIGN PATENT DOCUMENTS

| | | |
|---|---|---|
| GB | 2 241 348 | 8/1991 |
| WO | WO 90/08970 | 8/1990 |

OTHER PUBLICATIONS

Xu et al. Evidence of Space–Charge Effects in Thermal Poling, IEEE Photonics Technology Letters, vol. 11, No. 10, pp. 1265–1267, Oct. 1999.*
Blazkiewicz et al, "Modification of Thermal Poling Evolution Using Novel Twin–Hole Fibers", Aug. 2001, pp. 1149–1154, vol. 19, No. 8, Journal of Lightwave Technology, New York, NY.
Xu et al, "Specialty Optical Fibre for Stabilising and Enhancing Electro–Optic Effect Induced by Poling", Jul. 20, 2000, pp. 1265–1266, vol. 36, No. 15, Electronics Letters, Great Britain.
IEICE Trans. Comm., vol. E82–C, No. 8; Aug. 1999, p. 12–83–1286, (IEE), Thermal Poling of Boron–Codoped . . . , XU et al.
Derwent Abst. Accession No. 89–317274/44, EP 339 385 A (Siemens AG), Nov. 2, 1989.

* cited by examiner

Primary Examiner—John D. Lee
Assistant Examiner—Sarah U Song
(74) Attorney, Agent, or Firm—Stites & Harbison PLLC; Ross F. Hunt, Jr.

(57) ABSTRACT

An optical waveguide (11) includes a region (22) which, after electrical poling of a guiding region (16), maintains an internal electric field induced by the poling potential. The internal electric field may arise from charge separation between regions (18, 20) induced by an adjacent poling electrode (12A), and region (22) acts to inhibit decay of the space charge and to increase the lifetime of the induced electro-optic effect. The waveguide may comprise a twin hole optical fiber (11) with internal electrodes (12A, 14A), where the region (22) comprises a borosilicate layer concentrically disposed about one of the electrodes.

28 Claims, 3 Drawing Sheets

Novel Charge-Separated Twin-hole Fibre

US 6,839,495 B1

POLED WAVEGUIDE STRUCTURE WITH STABILIZED INTERNAL ELECTRIC FIELD

FIELD OF THE INVENTION

The present invention relates broadly to optical waveguides, and in particular, waveguides suitable for being poled.

BACKGROUND OF THE INVENTION

Inducing a polarisation in a material (hereinafter referred to as poling) involves exposing the material to an intense electric field, usually whilst the material is either subjected to a heating process or a UV irradiation. For optically transmissive materials, the poling process may effect a change in the optical second-order non-linearity.

When the material comprises the core of an optical fibre, a twin-hole fibre structure is typically used for poling. In a twin-hole fibre, two longitudinal holes are located in the silica cladding on opposite sides of the core, and each hole contains a wire-like electrode. A poling voltage applied across the electrodes generates the electric field for poling the core.

It has been reported that during poling, a positively-charged layer forms in the material around at least one of the electrodes and a negatively-charged layer forms adjacent and around the positively-charged layer. In a standard twin-hole fibre, the positively-charged layer forms near and around the periphery of at least one of the longitudinal holes and the negatively-charged layer forms separately from and around the outer circumference of positively-charged layer.

SUMMARY OF THE INVENTION

The present invention provides an optical waveguide structure arranged to be electrically poled, wherein the waveguide structure includes a region which, when poled with an external electric field, acts to stabilise an internal electric field in the region after the external electric field has been removed.

Preferably, the internal electric field is a result of a space charge induced in the region by the external electric field, and the region acts to inhibit decay of the space charge. Preferably, the region acts to inhibit decay of an optical second-order non-linearity induced in the region as a result of poling with the external electric field.

The region may comprise a charge-trapping material, a charge-donating material, or both a charge-trapping material and a charge-donating material.

The structure may be in the form of an optical fibre. Alternatively, the structure may be the form of a planar optical waveguide.

In one embodiment, the optical fibre includes a hole extending longitudinally in the optical fibre, wherein the hole is arranged to receive an electrode, and the region is arranged circumferentially around the hole.

The waveguide structure may comprise a tunable coupler, a phase modulator, a tunable attenuator, a tunable broad band filter, a tunable narrow band filter, a tunable Bragg grating device, a router, a switch, an intensity modulator, a travelling wave modulator, a non-linear optical device such as a SHG, THG, electrically tunable laser, or a sensor such as a voltage sensor.

Embodiments of the invention will now be described, by way of example only, with reference to the accompanying drawings.

DETAILED DESCRIPTION OF THE PREFERRED EMBODIMENT

Figure 1:
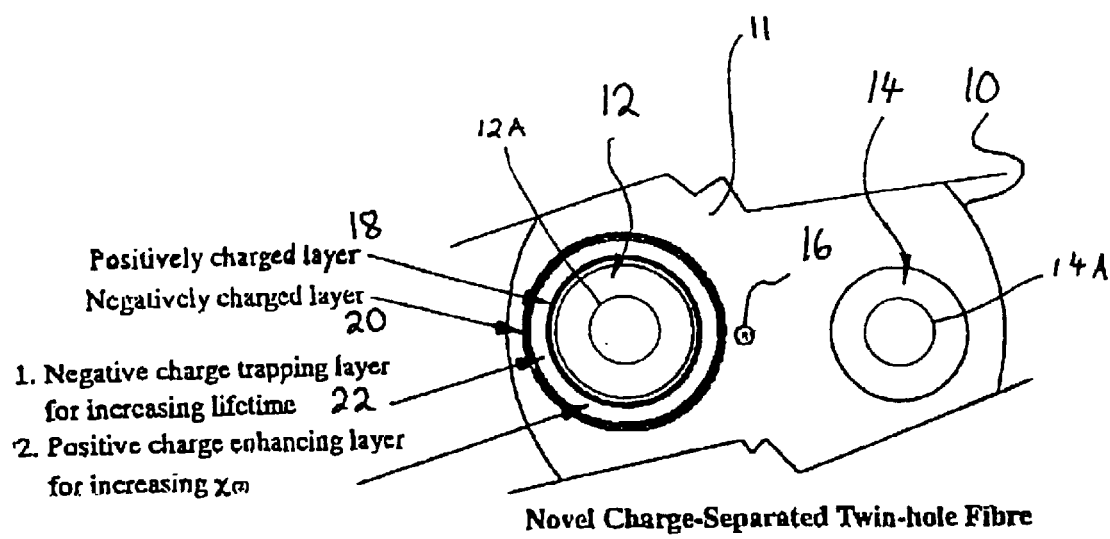
FIG. 1 shows a cross-sectional view of an optical fibre embodying the present invention.

In FIG. 1, a twin-hole fibre 10 comprises cladding 11 in which two longitudinal holes 12, 14 extend along the fibre 10. A core 16 of the optical fibre 10 is located between the holes 12, 14. Each hole 12, 14 contains an electrode 12A, 14A extending longitudinally in the hole. During poling, the core 16 is exposed to an intense external electric field by applying a high poling voltage across the electrodes 12A, 14A whilst the entire fibre 10 is heated. The poling voltage induces a positively-charged layer 18 around one of the holes 12, and a negatively-charged layer 20 around the positively-charged layer. Typically, the charged layers 18, 20 occur around the hole containing the anode.

A region 22 extends circumferentially around the hole 12 and between the positively-charged layer 18 and the negatively-charged layer 20. In this embodiment, the optical fibre 10 is silica-based, and the region 22 is a charge trapping layer that comprises a borosilicate glass. (In other embodiments region 22 may comprise a charge-enhancing (i.e. charge-donating material).) It is believed that the borosilicate maintains an internal electric field in the region 22 after the external electric field has been removed, by inhibiting charge-neutralisation between the charged layers 18, 20. It is thought the borosilicate achieves this by trapping electrons at the boron sites of the borosilicate. In other words, the borosilicate maintains a space charge which forms during poling, thus giving rise to a persistent or "frozen-in" electric field which remains after the poling voltage is removed. It is further believed that the frozen-in electric field stabilises an optical second-order non-linearity which is induced in the silica while the poling voltage is applied.

Figure 2A:
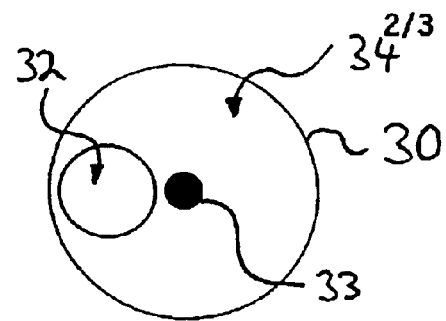
FIGS. 2a to c are schematic drawings illustrating a method of producing a pre-form for an optical fibre embodying the present invention.

Turning now to FIG. 2a, a pre-form 30 for the optical fibre shown in FIG. 1 is produced by firstly drilling one hole 32 into the pre-form 30. The hole 32 is located in the cladding 31 around the core 33 of the pre-form 30.

Figure 2B:
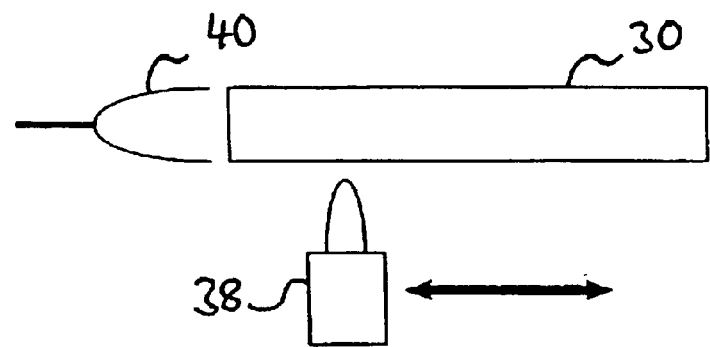

As illustrated in FIG. 2b, a borosilicate region 36 is then formed using a chemical vapour deposition technique to deposit a layer of borosilicate. The technique involves periodically scanning a heating flame 36 along a length of the pre-form 30, whilst a vapour 40 including borosilicate is directed towards the end face of the pre-form 30. A portion of the vapour 40 enters the hole 32 and impinges on the internal surface of the hole 32. The preform is rotated whilst the flame 38 is periodically scanned.

Figure 2C:
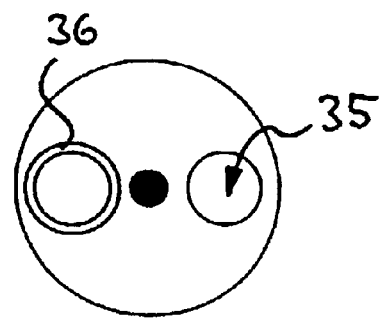

After deposition of the borosilicate layer 36, a further layer of silica is then deposited on top of the borosilicate layer 36 using the same deposition technique with a vapour containing silica. Finally, a further hole 35 (FIG. 2c) is drilled into the pre-form 30, before drawing an optical fibre from the pre-form 30.

Figure 3:
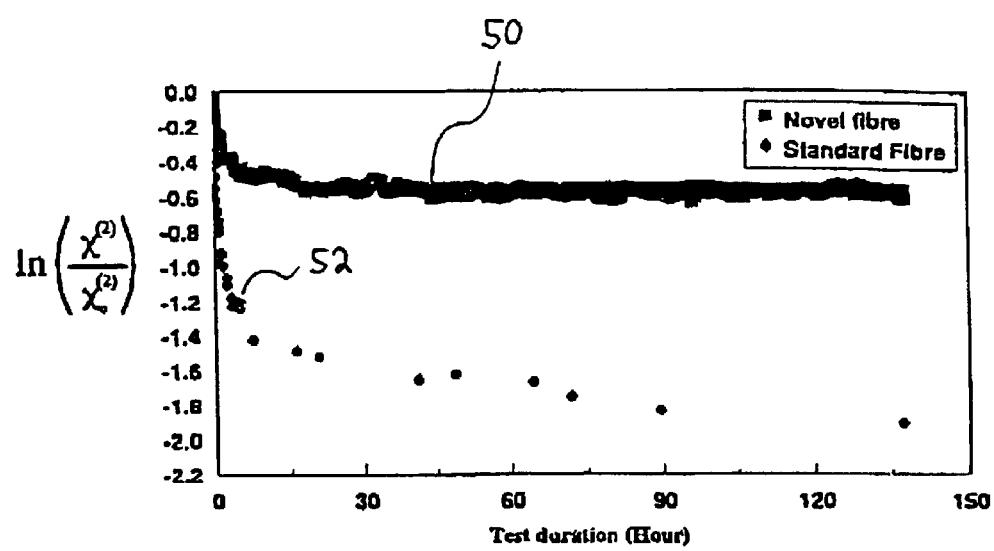
FIG. 3 shows comparative data illustrating the characteristics of an optical fibre embodying the present invention.

In FIG. 3, comparative data illustrating the variation of the electro-optic coefficient induced by poling between an optical fibre embodying the present invention and a standard twin-hole fibre is shown. The comparison was made by way of an accelerated aging test, where the fibres are held at 110° C. to accelerate the decay of the induced optical second-order non-linearity $X^{(2)}$.

In the twin-hole fibre embodying the present invention, the decay of space charge induced in the borosilicate layer during poling is inhibited, which in turn inhibits the decay of the induced second-order non-linearity $X^{(2)}$. As can be seen from FIG. 3, for the optical fibre embodying the present invention (curve 50) the second-order non-linearity initially decays by about 20%, instead of about 60% for the standard twin-hole fibre (curve 52). Furthermore, the decay rate after about 17 hours is flatter for the fibre embodying the present invention (curve 50).

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

What is claimed is:

1. An optical waveguide structure arranged to be electrically poled, comprising:
    a portion of said structure for receiving or acting as an electrode; and
    a region of said structure comprising charge-trapping material disposed near or adjacent to said portion, for inhibiting charge neutralization between a positively charged region and a negatively charged region induced by said poling and thereby stabilizing an internal electric field between said positively charged region and said negatively charged region.
2. The optical waveguide structure as claimed in claim 1, wherein the internal electric field is a result of space charges induced in the waveguide structure by the external electric field, and the region acts to inhibit decay of the space charges.
3. The optical waveguide structure as claimed in claim 1, wherein the region acts to inhibit decay of an optical second-order non-linearity induced in the waveguide structure as a result of poling with the external electric field.
4. The optical waveguide structure as claimed in claim 1, further comprising a region comprising a charge-donating material near or adjacent to said portion.
5. The optical waveguide structure as claimed in claim 1, wherein the waveguide is formed from a silica-based material.
6. The optical waveguide structure as claimed in claim 1, wherein the charge-trapping material comprises borosilicate.
7. The optical waveguide structure as claimed in claim 1, wherein the structure comprises a planar optical waveguide.
8. The optical waveguide structure as claimed in claim 1, wherein the structure comprises an optical fiber.
9. The optical waveguide structure as claimed in claim 1, wherein the structure comprises at least two electrode holes extending longitudinally in said structure, wherein each of the holes is arranged to receive an electrode, and the region is arranged circumferentially around at least one of the holes.
10. The optical waveguide structure as claimed in claim 1, wherein said portion comprises an electrode hole arranged to receive an electrode.
11. The optical waveguide structure as claimed in claim 10, wherein the region is arranged circumferentially around the hole, thereby stabilizing the internal electric field between said positively charged region and said negatively charged region.
12. The optical waveguide structure as claimed in claim 11, wherein the charge-trapping material comprises borosilicate.
13. The optical waveguide structure as claimed in claim 1, including silica deposited onto said region.
14. An optical waveguide structure arranged to be electrically poled, comprising:
    a portion of said structure for receiving or acting as an electrode; and
    a region of said structure comprising a charge-donating material disposed near or adjacent to said portion, for providing space charges and thereby enhancing an internal electric field between positively and negatively charged regions induced by said poling.
15. The optical waveguide structure as claimed in claim 14, wherein the internal electric field is a result of space charges induced in the waveguide structure by the external electric field.
16. The optical waveguide structure as claimed in claim 14, further comprising a region comprising charge-trapping material disposed near or adjacent to said portion.
17. The optical waveguide structure as claimed in claim 16, wherein the charge-trapping material comprises borosilicate.
18. The optical waveguide structure as claimed in claim 14, wherein the waveguide is formed from a silica-based material.
19. The optical waveguide structure as claimed in claim 14, wherein the structure comprises a planar optical waveguide.
20. The optical waveguide structure as claimed in claim 14, wherein the structure comprises an optical fiber.
21. The optical waveguide structure as claimed in claim 14, wherein said portion comprises an electrode hole arranged to receive an electrode.
22. The optical waveguide structure as claimed in claim 21, wherein the region is arranged circumferentially around the hole, thereby stabilizing the internal electric field between said positively charged region and said negatively charged region.
23. The optical waveguide structure as claimed in claim 14, wherein the structure comprises at least two electrode holes extending longitudinally in said structure, wherein each hole is arranged to receive an electrode, and the region is arranged circumferentially around at least one of the holes.
24. The optical waveguide structure as claimed in claim 14, including silica deposited onto said region.
25. A poled optical waveguide structure, comprising:
    a portion of said structure for receiving or acting as an electrode;
    a region of said structure comprising a charge-trapping material disposed near or adjacent to said portion; and
    a positively charged region and a negatively charged region induced by the poling of said structure;
    wherein said region inhibits charge neutralization between said positively and negatively charged regions and thereby stabilizes an internal electric field between said positively and negatively charged regions.
26. The poled optical waveguide structure as claimed in claim 25, wherein said portion comprises an electrode hole arranged to receive an electrode.
27. A poled optical waveguide structure, comprising:
    a portion of said structure for receiving or acting as an electrode;
    a region of said structure comprising a charge-donating material disposed near or adjacent to said portion; and
    a positively charged region and a negatively charged region induced by the poling of said structure;
    wherein said charge-donating material provides space charges for enhancing an internal electric field between said positively and negatively charged regions.
28. The poled optical waveguide structure as claimed in claim 27, wherein said portion comprises an electrode hole arranged to receive an electrode.

* * * * *